Dec. 13, 1938.  C. R. HANNA  2,140,359
VALVE ARRANGEMENT OF INERTIA SHOCK ABSORBERS
Filed Dec. 14, 1934  3 Sheets-Sheet 1
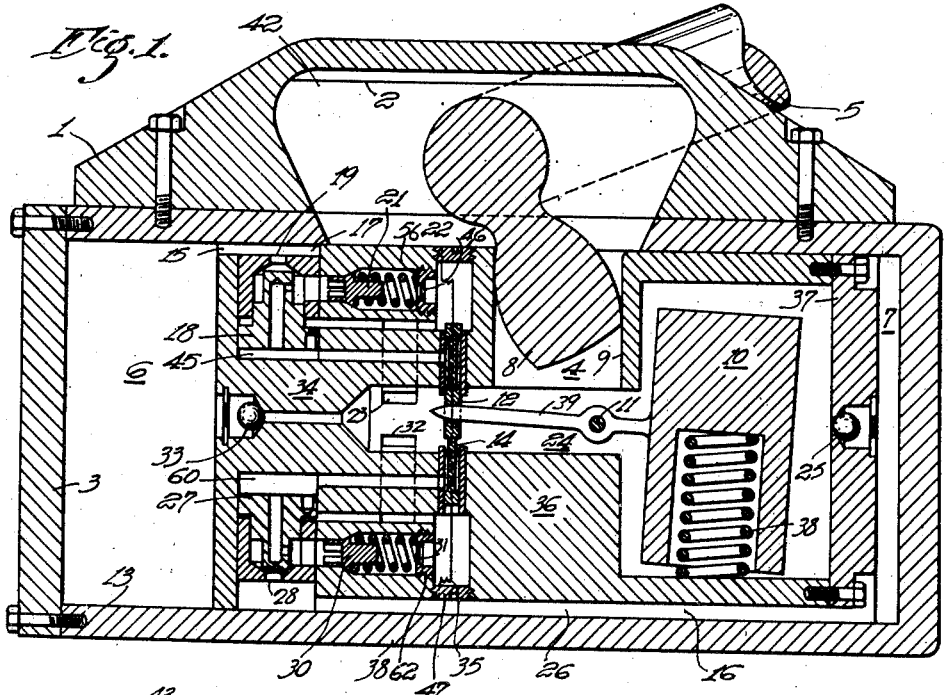
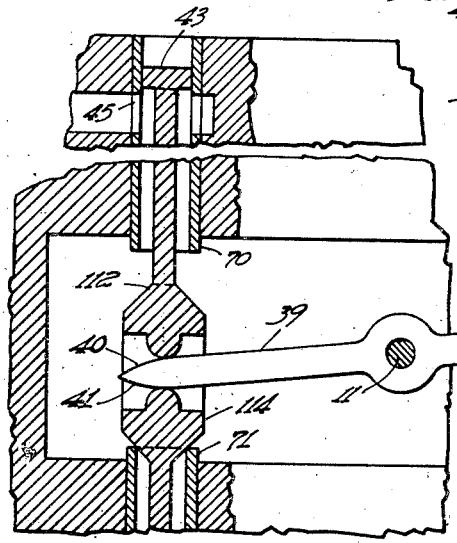
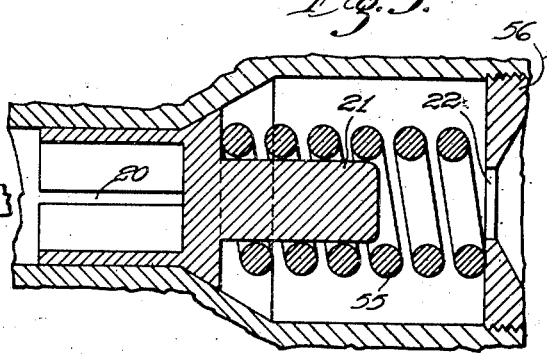
INVENTOR
Clinton R. Hanna.
BY
Paul E. Friedemann
ATTORNEY

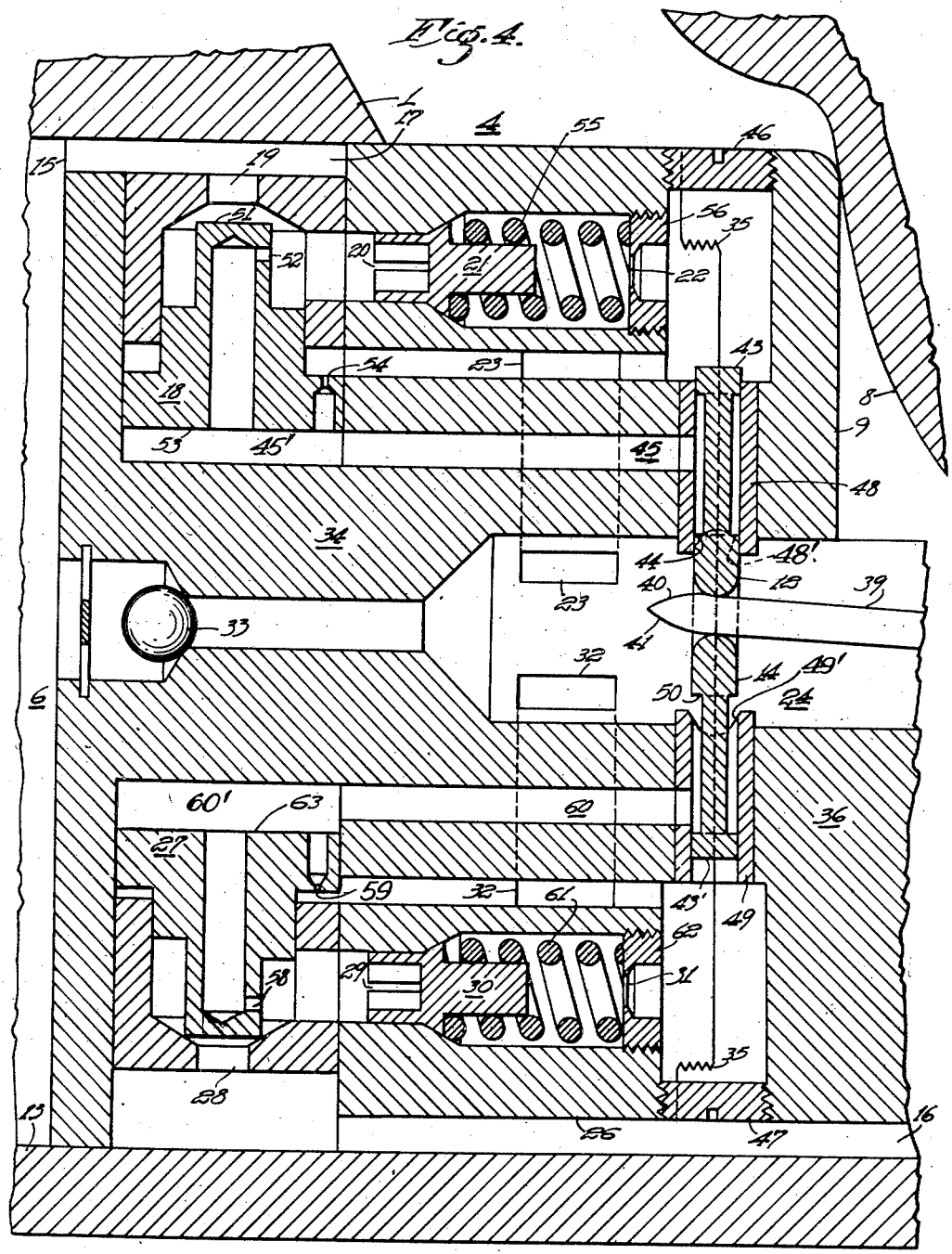

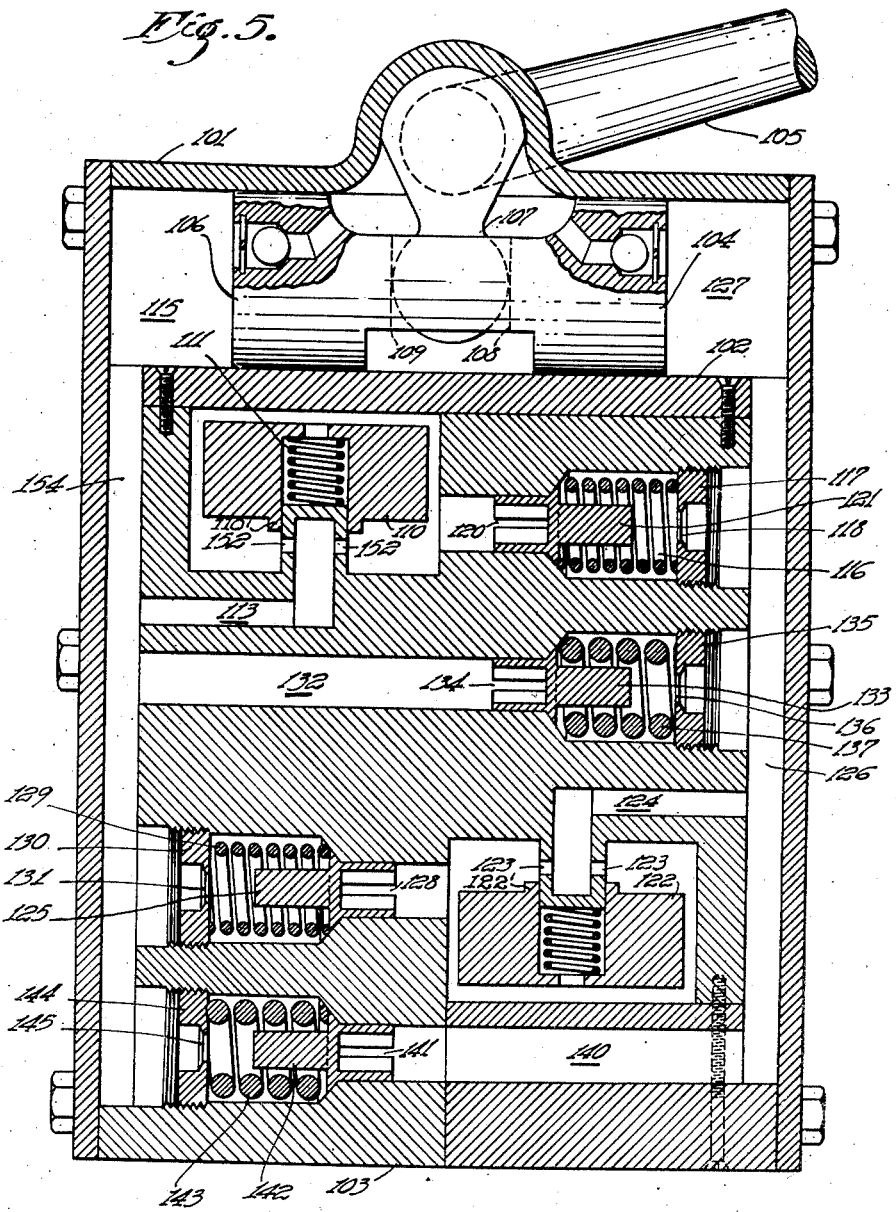

Patented Dec. 13, 1938

2,140,359

UNITED STATES PATENT OFFICE 2,140,359

VALVE ARRANGEMENT OF INERTIA SHOCK ABSORBERS

Clinton R. Hanna, Pittsburgh, Pa., assignor to Westinghouse Electric & Manufacturing Company, East Pittsburgh, Pa., a corporation of Pennsylvania Application December 14, 1934, Serial No. 757,460

21 Claims. (Cl. 188—88)

My invention relates, generally, to shock absorbers, particularly shock absorbers for vehicles, and constitutes an improvement in the shock absorbers covered in my copending application, Serial No. 564,281, filed September 22, 1931.

In the following description, the operation of my invention will be described in connection with a vehicle, although it is to be understood that it may be utilized in connection with other apparatus having relatively movable masses connected by a resilient member.

Also, in this description, the vehicle may be considered as having two parts which may, in the interest of clarity, be conveniently referred to as the sprung and unsprung masses. The sprung mass comprises that part of the vehicle which is supported by the springs, and the unsprung mass comprises the axle and the wheels and any other parts that may be mounted thereon.

An object of my invention is to provide for resisting the relative movements of the sprung and the unsprung masses of a vehicle in order to insure smooth and improved riding qualities of the sprung mass.

A more specific object of my invention is to provide for resisting the relative movements of the sprung and the unsprung masses of a vehicle by a force that is proportional to the velocity of one of the masses and by a force that is a function of the rate of change of vertical velocities of the other of said masses.

A further object of my invention is to resist the movements of the unsprung mass by a relatively small force which is proportional to the velocity of the unsprung mass.

Another object of my invention is to provide for resisting the relative movements of the sprung and the unsprung masses of the vehicle with a relatively small force, which force is proportional to the velocity of the unsprung mass, during the periods when the vertical velocity of the sprung mass is constant or decreasing.

A further object of my invention is to provide for resisting the relative movements of the sprung and the unsprung masses of a vehicle with a force proportional to the velocity of the sprung mass while the velocity is changing.

It is also an object of my invention to provide for resisting the relative movement of the sprung mass to the unsprung mass by a force substantially proportional to the displacement of the unsprung mass of the vehicle with regard to the sprung mass.

A still further object of my invention is to limit the resisting force to the relative movement of the sprung and unsprung masses to the force exerted by the resilient means interconnecting the sprung and the unsprung masses in accelerating the sprung mass.

A more general object of my invention is to provide low velocity damping for movements of the unsprung mass.

Another more general object of my invention is to provide high velocity damping for movements of the sprung mass.

A still further somewhat general object of my invention is to provide a resisting force to movements of the sprung mass no greater than the unbalanced force of the resilient means interconnecting the sprung and unsprung masses.

A further object of my invention is to provide a resisting force to the vertical movement of the sprung mass that increases with an increase in vertical velocity of the sprung mass until it equals the force exerted by the resilient means interconnecting the sprung and unsprung masses and thereafter provide a resisting force to vertical movements of the sprung mass substantially equal to the force exerted by the resilient interconnecting means.

It is also an object of my invention to provide for reducing the frequency of the free oscillations of the sprung mass of a vehicle, whereby it is less likely to be influenced by the undulations of the road surface.

It is a further object of my invention to provide for absorbing the kinetic energy of the unsprung mass when it reaches its maximum vertical velocity, or at a time slightly thereafter, to insure good traction between the wheels and the irregularities of the road surface.

Other objects and advantages will be recognized and a fuller understanding of my invention will be had from a study of the following specification and the accompanying drawings, in which:

Figure 1 is a view of a longitudinal section of the casing, piston, and actuating member for the piston of my inertia controlled hydraulic shock absorber;

Fig. 2 is a sectional view of a modified valve structure actuated by the mass which is controlled in position by the acceleration of the sprung mass of a vehicle using my shock absorber;

Fig. 3 is an enlarged view of one of the pressure relief valves shown in Fig. 1;

Fig. 4 is an enlarged sectional view of the left-hand end portion of the structure shown in Fig. 1; and Fig. 5 is a modification of the type of shock absorber shown in Fig. 1 but not utilizing multiplier valves.

Referring now to the drawings and more particularly to Figs. 1 and 4, the reference character 1 designates a housing in which the shock absorber liquid is retained and in which the various mechanical parts of the shock absorber are mounted. The level of the liquid is indicated by the line 2.

The lower part of the housing 1 constitutes a horizontal cylinder 13 having a removable head 3. A two-way piston 4 is mounted in the cylinder and may be actuated, in accordance with the relative movement of the sprung and unsprung masses of a vehicle, by means of an arm 5 which may be connected to the axle or unsprung mass (not shown).

As will be observed, the piston 4 is, of course, shorter than the cylinder, thereby providing chambers 6 and 7 for subjecting the liquid contained therein to pressure for resisting the relative movements of the sprung and unsprung masses of the vehicle.

The actuating arm 5 may be journaled in the housing 1 in any suitable manner to enable it to function as a crank to reciprocate the piston 4 within the cylinder. Preferably, as shown in Figs. 1 and 4, the arm 5 is provided with a cam 8 that is disposed to engage a suitably shaped recess 9 in the piston 4. The free end of the actuating arm 5 may be connected to the axle (unsprung mass) of the vehicle, in any suitable manner, (not shown). In this instance, it has been deemed unnecessary to show the manner in which the housing 1 may be mounted on the sprung mass of the vehicle, since the general construction of such mounting is a matter of common knowledge.

Therefore, as the sprung and unsprung masses of the vehicle approach each other, as they will do, after an irregularity in the road surface is encountered, the piston 4, shown in Figs. 1 and 4, moves to the right, and when the masses move in the opposite direction, or separate, the piston 4 moves to the left. In this manner, the piston 4 may operate to resist the relative movements of the sprung and unsprung masses, regardless of whether they are approaching or separating from each other.

In this embodiment of my invention, the piston 4 carries a weight 10 pivotally mounted on a pin 11 and which weight will hereinafter be designated the control mass. The mass is adapted to operate either one of two oppositely disposed hydrostatically balanced valves 12 and 14.

Also, in order to provide for the interchange of fluid between the chambers 6 and 7, the piston 4 is provided with two passages 15 and 16 that extend throughout the length of the piston.

As the piston 4 is actuated to the left, the liquid in chamber 6 flows through the fluid passage 15 in the following manner: First, through a goove 17 that is provided at the top of the piston 4 and which leads to the multiplier valve 18, the opening 19 controlled by the valve 18, the slit, or opening, 20 of the spring biased valve 21 which will be forced open by the liquid pressure, the thin walled orifice or restricted passage 22, the inclined or arcuate passage 23, the passage 24, and the ball-check valve 25 to the chamber 7. The liquid flow will, of course, be modified by the position of balanced valve 12, the operation of which will be described more in detail hereinafter.

In a similar manner as the piston 4 is actuated to the right, as viewed in the drawings, the fluid in the chamber 7 flows through the passage 16 in the following manner: First, through a groove 26 that is provided at the bottom of the piston 4 and which leads to the multiplier valve 27, the opening 28 controlled by the multiplier valve 27, the slit 29 of the spring biased valve 30, which valve will be forced open by the liquid pressure, the thin walled orifice 31, the inclined or arcuate passage 32, and ball-check valve 33 to the chamber 6. Valve 14 is shown as open in Figs. 1 and 4 and when thus open, places conduit 60 in direct communication with the low pressure passage 24. For the normal position of the weight 10, and also the position shown for the weight 10, the position of valve 14 will, of course, be open. From the more detailed disclosure given hereinafter the above-mentioned modification of the liquid flow will become apparent.

As is manifest, the ball-check valve 33 provides a positive check to the flow of liquid through the passage 16 when the piston is actuated toward the left, while at the same time, the ball-check valve 25 operates to permit the liquid to flow freely through the passage 15.

Similarly, when the piston is actuated to the right, the ball-check valve 25 provides a positive check to the flow of liquid through the passage 15, while at the same time, the ball-check valve 33 operates to permit the liquid to flow freely through the passage 16.

One of the distinguishing features of my invention over the devices of the prior art is the use of hydrostatically balanced valves in combination with inertia-responsive means, and the use of the combination of inertia-responsive means, multiplier valves, and hydrostatically balanced valves, and also the use of these combinations in combination with relief valves.

A hydrostatically balanced valve is one in which the effective area exposed to fluid pressure is zero or substantially zero. Such a valve will resist high fluid pressures, or more specifically, high liquid pressures with the application of a small force. My invention provides, among many other features, a successful and practical combination of a hydrostatically balanced valve with a multiplier valve.

With the use of a multiplier valve the flow of only a small amount of liquid is actually controlled by the inertia controlled balanced valve. The result is smooth and noiseless operation, that is, no chattering of the balanced valve occurs. Balanced valves, if called upon to control large flows of liquid, have been known to sometimes operate improperly and unsatisfactorily because of oscillation or chattering of the valves. Such chattering is entirely eliminated by my invention.

In order to accomplish the objects and novel results of my invention, I provide for controlling the flow of the liquid through the passages 15 and 16 by inertia-controlled slide valves 12 and 14. Although I have shown a pair of slide valves, it is to be understood that I do not wish to limit myself to this particular type of valve, since there are other types of valves of the hydrostatically balanced type that function substantially in the same manner. The valves may be mounted and operated in any suitable manner to control the flow of the fluid through the passages 15 and 16.

As hereinbefore stated, the casing 1 has a cylindrical portion 13 at the lower part thereof substantially cup shaped and the open end of the cup being provided with a closure 3. The piston 4 consists of three parts 34, 36 and 37. The part 34, housing most of the operating mechanisms of the shock absorber, is firmly held in the part 36 by the screw threads 35. The part 36 is provided with the end portion 37 which houses the ball check valve 25 and otherwise provides a closure for the chamber housing the weight 10.

The weight 10 is normally held in a balanced position by a spring 38 and is pivoted on a pin 11. An arm 39, secured to the weight and oscillating about the pin 11, is provided with arcuate end portions 40 and 41 so as to provide a rolling engagement with the curved portions of the valves 12 and 14.

The casing is also provided with an upper reservoir or liquid supply chamber 42 which normally contains a liquid substantially filling the reservoir, the compression chambers, and the various conduits in the piston 4. The liquid from the supply chamber 42 passes through the recess 9 into the region or passage 24 and through ball check valves 25 and 33 as well as the arcuate apertures 23 and 32 to the compression chambers 6 and 7. A mere inspection of the ball check valves 25 and and 33 shows that the liquid is free to flow from the reservoir into the compression chambers. However, when the liquid in the compression chambers is subjected to pressure by the movement of the piston 4, the ball check valves 25 and 33 move against their respective seats and prevent any transfer of the liquid from the particular chamber subjected to the action of the piston to the central portion 24.

The valves 12 and 14 are alike in structure and are in effect mounted upon an integral stem provided with a slit at the mid-portion thereof having arcuate ends for engaging the arcuate portions 40 and 41 of the actuating lever or arm 39. The valve 12 is provided with an upper piston portion 43 which has a lower area equal to the area of the upper surface of the piston portion 44 of the valve 12. (This relation also applies to valve 14.) It is, therefore, apparent that any pressure in the conduit 45 will not subject the valve to an actuating pressure in the opening direction or at least will subject it substantially to no force. A very small actuating force of the arm 39 and thus the weight 10 will tend to close the valve 12.

To facilitate the insertion of the valves 12 and 14, the side portions of the piston are provided with closure members 46 and 47 screw threaded into the piston 4. A pair of sleeves 48 and 49 is positioned in the piston providing a guide for the valves 12 and 14. The inner portions or ends of the sleeves 48 and 49 have arcuate transverse cut-out portions 48' and 49', respectively, so that when the shoulder portions 44 and 50 of the valves 12 and 14 respectively, move to closing position, the closing action is not effected in an abrupt manner.

A multiplier valve 18 is disposed in series with the valve 12 and this multiplier valve has an upper portion 51 adapted to close the opening 19. An orifice 52 is provided in the multiplier valve, which orifice is considerably smaller than the opening 19 and permits a restricted flow of liquid from the compression chamber 6 into the conduit 45 whereby a pressure is exerted upwardly on the lower area 53 of the multiplier valve 18 and the pressure thus exerted is determined by the rate of flow of the liquid through the orifice 52 and the rate of leakage through the small orifice 54 provided in the piston portion or lower portion of the multiplier valve 18.

When the valve 12 is open, there will be no tendency for the end portion 51 of valve 18 to close the opening 19, since there will be a free flow of liquid from the conduit 45 into the region 24.

Under such conditions, liquid flowing from the compression chamber 6 will pass through the slot 17, the opening 19, the orifice 52 and the conduit 45 into the region 24 and through ball check valve 25 to the chamber 7 which at that time will be under no compression. In fact, it will be at a relatively low pressure. If the piston movement in the direction toward the left be rapid, as it will normally be when the vehicle is operating over the road bed at a fairly high speed and a depressed portion is encountered on the road bed, for a rapid movement of the piston 4, liquid will not only pass to the conduit 45 through the multiplier valve, but will also be actuated toward the right against the action of the spring 55. The valve 21, see Fig. 3, is of the type wherein the area of the opening is directly proportional to the pressure acting on the valve, namely, directly proportional to the deflection of the spring 55. To accomplish this in a simple manner, the valve is provided with a sleeve portion having a slit 20 and the spring is under substantially no compression when the valve is closed. At zero pressure on the valve there will, of course, be zero opening, but the area of the opening through the slit 20 will be directly proportional to the deflection.

At the right hand portion of the spring 55 is disposed a nut 56 having an aperture 22. The area of the aperture 22 may be made adjustable by simply selecting from a plurality of nuts having aperture or orifices of different sizes, the particular size that is desired. By a proper design of the multiplier valve 18, the valve 21 and a proper selection of the size of the thin walled orifice 22, the resisting force to a movement of the piston may be made directly proportional to the volume velocity of the liquid displaced in the compression chamber. This means that the pressure in the compression chamber may be made directly proportional to the velocity of movement of the piston or, in other words, the shock-absorbing action. When the valve 12 is closed, the pressure in the compression chamber is directly proportional to the vertical velocity of the sprung mass, assuming that the casing is connected to the sprung mass which is the usual arrangement for shock absorbers. When the valve 12 tends to open, the resisting force will be directly proportional to the force of the spring of the vehicle tending to accelerate the sprung mass. The utility of this arrangement, or multiplying valve means including the elements 12, 18, 21 and 22, will become more apparent from a study of the operation given more in detail hereinafter.

At the initial stages of liquid, or fluid, flow past valve 21 the spring 55 alone resists liquid flow but as soon as the flow takes on any proportions at all a pressure is built up in the region occupied by the spring 55, which pressure also acts on valve 21. The size of the orifice 22 is thus of importance in controlling fluid flow. Nut 56 is, therefore, designed to be removable so that nuts, having various size openings, may be inserted.

The lower portion of the piston 4 is also provided with a multiplier valve 27, which has an aperture 58 and a small leakage aperture 59. This multiplier valve is disposed in series relation with the valve 14 and coacts with valve 14 in exactly the manner that the multiplier valve 18 coacts with the valve 12.

Of course, when valve 14 is opened, as shown, fluid, when forced out of the compression chamber 7, flows through the slot 26 longitudinally of the piston 4, through the opening 28 and the orifice 58 to the conduit 60 and, since valve 14, as stated, is open, no multiplying action will be effected since pressure cannot build up in the conduit 60. However, for rapid movements of the piston, liquid will also be forced through the valve 30, which has the spring 61 also disposed under substantially no compressive force when the valve 30 is closed, but which valve opens permitting a flow of liquid through the slit 29. The opening of this slit is proportional to the deflection of the valve 30 and is thus proportional to the pressure on the valve due to liquid pressure in the compression chamber. By the selection of a nut 62 having an aperture 31 of the desired size, the resistive force to movement of the sprung mass can be made directly proportional to the velocity of the sprung mass. The design and function of nut 62 and its orifice is just like the nut 56 and orifice 22.

In the absence of any shock absorber, the relative movement of the sprung and unsprung mass is substantially as follows: Let it be assumed that the springs of the vehicle are compressed, as they will be after the vehicle passes over a raised portion of the road surface. Under this assumed condition, the springs of the vehicle will move the sprung mass upwardly, first with an increasing vertical velocity and then with a decreasing vertical velocity as the springs approach the end of their expansion, and then the sprung mass will be moved downwardly, first with an increasing vertical velocity and then with a decreasing vertical velocity as the springs approach the ends of their second compression.

With the use of my shock absorber, this relative movement of the sprung and unsprung mass is modified considerably. Assuming that the arm 5 is connected to the unsprung mass and that the casing of the shock absorber is connected to the sprung mass, and while the vehicle is operating over the road, a raised portion is encountered, the arm 5 will be moved in a counterclockwise direction, and since the actuating or bell-crank portion of the lever having the cam portion 8 engages in the recess 9, the piston 4 will be moved toward the right. Since, however, under the conditions assumed, the sprung mass is not being accelerated in a vertical direction, the mass 10 will be in its balanced position, so that both valves 12 and 14 are open, and a movement of the piston 4 toward the right will, of course, close the ball check valve 25. However, since valve 14 is open, the upper area 53 of the multiplier valve 27 will not be subjected to an excessive pressure and, in consequence, there will be a free flow condition of the fluid from the compression chamber 7. Of course, if the movement is rather rapid, as it normally will be, fluid will also flow through the slit 29 of the valve 30. By the proper selection of the size of the orifice 31 and the vlave 30, the actual movement or the movement of the unsprung mass will be dampened by a force proportional to the velocity of movement of the unsprung mass.

Immediately when a compression of the springs takes place, the sprung mass will be accelerated in a vertical direction and the weight 10 will tend to take the position indicated in Fig. 1. However, as long as the movement of the piston is toward the right, no controlling action as a function of the vertical acceleration of the sprung mass takes place, since the flow of fluid is still from the compression chamber 7 into the supply chamber and through the ball check valve 33 to the low pressure chamber 6. However, before the sprung mass can have attained any vertical velocity of importance, the relative movement of the sprung and unsprung mass will change, namely, the springs of the vehicle will begin to expand from their compressed position, moving the arm 5 in a clockwise direction and thus moving the piston 4 toward the left. Since the acceleration of the sprung mass is in a vertical direction, the weight 10 will close the valve 12 at the valve engaging surface or region 44 with the result that the liquid in the compression chamber 6 will flow through recess 17, opening 19 and orifice 52 into the conduit 45. Since the valve 12 is closed at this stage of operation, the multiplier valve will tend to close the opening 19 by reason of the pressure being built up in the chamber 45', which pressure acts on the relatively large area 53 of the multiplier valve. The quantity of liquid as well as the pressure in the chamber 45' may be small whereas the pressure in the compression chamber 6 being controlled, is high.

The main portion of the liquid that must, of course, be displaced from the compression chamber 6, passes through the opening 19, valve 21, the thin walled orifice 22, the arcuate conduit 23 into the region 24 and thus into the supply reservoir 42. Liquid also passes to the low pressure chamber 7 through the ball check valve 25.

In view of the explanation of the coaction of the multiplier valve, the valve 21 and the orifice 22 hereinbefore given, it is apparent that the force necessitating the vertical acceleration of the sprung mass is a function of the velocity of the sprung mass. While the sprung mass is being accelerated in a vertical direction, the resisting force builds up until it is equal to the force of the spring tending to accelerate the sprung mass. At this point, there would be a tendency, assuming, for the moment, that there be no change in the forces involved, that the unsprung mass would tend to follow the sprung mass in its vertical movement. In other words, when the resisting force equals the force of the spring tending to accelerate the sprung mass in a vertical direction, the connection between the sprung mass and the unsprung mass for the moment becomes a rigid connection, but it is also true that the vertical acceleration ceases with the result that the weight 10 will move to open the valve 12, permitting a freer flow of the liquid through the opening 19. Opening of the valve 12 again permits vertical acceleration of the sprung mass and, in consequence, the valve 12 would tend to close. This opening and closing action in a theoretical sense occurs so rapidly that the valve 12 is gradually opened as a function of the spring force. This is accomplished all the more readily because the quantity of liquid that must be handled by the valve 12 is relatively small. The total result, therefore, of the action of the shock absorber, when a raised portion in the road is encountered and the sprung mass is accelerated in a vertical direction, is to resist such vertical acceleration by a force proportional to the velocity of the sprung mass and when this force equals the force exerted by the springs tending to accelerate the sprung mass, the resisting force is kept equal to that of the spring force so that the sprung mass moves relative to the unsprung mass, until the normal position of the sprung and unsprung mass is again obtained.

In other words, the sprung mass never causes the springs to elongate by reason of the inertia imparted to the sprung mass during the compression of the spring, but the shock-absorbing force is made a function of the velocity of the sprung mass during its initial vertical acceleration and is then permitted to decrease as the spring force decreases. In fact, the body or sprung mass of the vehicle, when the resisting force has become equal to the force of the springs, will return to its normal position without acceleration.

When a depression is encountered in the road bed, the springs will be elongated thereby actuating the arm 5 in a clockwise direction and moving the piston 4 toward the left. However, since, under such condition, the valve 12 will be open, there will be a free flow condition from the compression chamber 6 through the opening 20 of the valve 21 and orifice 22, and also through the aperture 52 and conduit 45 and valve 12. However, as soon as the sprung mass and unsprung mass begin to approach each other, the arm 5 will be moved in a counterclockwise direction and the liquid will be forced from the compression chamber 7, ball check valve 25 will close and the liquid will then be forced through the slot 26, the opening 28 and the orifice 58, into the chamber 69', but since valve 14 will be closed under these conditions, the fluid under pressure acting upon the upper comparatively large area 63 of the multiplier 27 will tend to close the opening 28. The resisting force to downward vertical acceleration will thus be proportional to the velocity of movement in a downward direction of the sprung mass up to and until the resisting force is equal to the force of the spring tending to accelerate the sprung mass downwardly, after which the valve 14 will gradually open and permit a flow of liquid in such manner that the resisting force thereafter remains equal to the force of the spring tending to accelerate the sprung mass downwardly.

As a practical proposition, valves 18 and 27 will not become fully seated by the compression of the fluid when the piston is moved to one or the other end while valves 12 or 14, as the case may be, are closed. It is, therefore, clear that the piston would not be prevented from completing its movement in a given direction. Assuming that, let us say, valve 12 is completely closed and valve 18 is fully seated, if pressure develops in compression chamber 6, valve 18 will become unseated regardless of the fact that valve 12 is closed, since the pressure acting on the end portion 51 will increase the pressure in the chamber 45' and cause liquid to be expelled at the orifice 54. In no situation will the piston thus be prevented from movement when the valves 12 and 14 and 18 and 27 have been completely closed.

One of the advantageous features of my shock absorber is the fact that the resisting force is a function of the velocity and, such being the case, no jars or impacts are imparted to the sprung mass, since the force is very small when the sprung mass begins to accelerate in the vertical direction and rises gradually and in a smooth manner until it is equal to the force of the spring.

In Fig. 2, a modification of the hydrostatically balanced valve is shown, which modification has been found to give very satisfactory performance and, in some instances or installations, may be preferred, since the shape of the valve seat of the respective valves 112 and 114 is that of a poppet valve. By such arrangement, a positive closure may be had, but the function is, in fact, not that of a pressure-responsive valve, because the inner area or opening of the sleeves 70 and 71 is equal to the area of the piston portions 43 and 43' of the valves 112 and 114. It is, therefore, clear that the valves are hydrostatically balanced valves. The valves 112 and 114 are brought into cooperative action with the lever arm 39 exactly in the manner indicated in Figs. 1 and 4.

While the showing in Figs. 1 and 2, as well as in Fig. 4, is made in connection with a piston operable in a cylindrical casing of a shock absorber, it is apparent that some or all of the operating mechanisms shown in Figs. 1 to 4, inclusive, may be mounted in a casing beside the piston and a pair of substantially solid pistons not having a recess, as shown in Fig. 1, may be utilized and conduits may lead from the respective compression chambers to the actuating mechanisms. See Fig. 5. A mere inspection of Fig. 5 shows how the operating mechanism illustrated in Figs. 1 and 2 may be brought into operative relation with a pair of pistons actuated by a bell crank lever. The modification shown in Fig. 5 is, however, one not utilizing a plurality of multiplier valves.

In the modification shown in Fig. 5, a casing 101 is provided with an upper cylindrical portion 102 and a lower portion 103 housing the operating mechanisms of my shock absorber. A pair of pistons 104 and 106 are disposed in the upper cylindrical portion 102 and are adapted to be operated back and forth in the cylindrical portion by the lever arm 105, which arm is connected to the unsprung mass, namely, the axle and the wheels and the parts connected thereto, of a vehicle using my shock absorber. The lever 105 is provided with a bell-crank portion 107 engaging the wearing surfaces 108 and 109 of the pistons 104 and 106, respectively. A weight 110 is disposed in the casing portion 103 and is held in a balanced position by a compression spring 111, the weight 110 being provided with a valve 110' disposed to open and close a pair of apertures 152 leading from the conduit 113, which conduit is in communication with the pressure chamber 115 through the conduit 154. A valve 121 having a slit 120 is disposed in series relation with the apertures 152 and the conduit 113. This valve 121 is held in a closed position by a spring 116, which spring is normally under substantially no compressive force when the valve 121 is closed. A nut 117 having an aperture 118 is disposed in series relation with the valve 121 and by an appropriate choice of size of the aperture 118, the flow of liquid from the compression chamber 115 when the apertures 152 are opened may be made directly proportional to the velocity of movement of the piston 106 toward the left.

The spring 116, a comparatively weak spring, is chosen so that the resisting force to the flow of liquid from the compression chamber 115 is relatively small, but nevertheless proportional to the velocity of movement of the piston 106. The spring 116 is further so chosen as to provide proper axle damping or damping for movements of the unsprung mass. A similar arrangement to the valve arrangement shown in the upper portion of the housing portion 103, is shown at the bottom, where a weight 122, held in a balanced position by a tension spring, is, by means of a valve 122' adapted to control the opening and closing of a pair of apertures 123 leading from the conduit 124 to the valve 125. The conduit 124 is in communication with the compression chamber 127 by means of a conduit 126.

The valve 125 is provided with a slit 128 and has a spring 129 which is normally under substantially no compression when the valve 125 is closed, but tends to resist the flow of liquid from the compression chamber 127 by a force proportional to the compression in the compression chamber. In series with the valves 125 is disposed a nut 130 having an aperture 131. By a proper selection of the size of the aperture 131, the resisting force to a flow of liquid from the compression chamber 127 may be made proportional to the velocity of movement of the piston 104. When the movement of the casing 101 which is normally connected to the sprung mass is in a vertical direction and the sprung mass is being accelerated, the weighted valves 110' and 122' will tend to close the apertures 152 and 123, depending upon whether the acceleration is vertically upwardly or vertically downwardly. When the acceleration is vertically upwardly, apertures 152 are closed and, in consequence, the liquid form the compression chamber 115 will be forced into the conduit 132 and the high pressure valve 133 will be forced open, permitting a flow of liquid through the aperture 134. In series with the valve 133 is a nut 135 having an aperture 136. By a suitable selection of the size of the aperture 136, the resistance to flow of liquid from the compression chamber 115 may be made proportional to the velocity of movement of the piston 106.

If the liquid in the compression chamber 127 is subjected to a pressure, liquid will be forced into the conduit 140 through the aperture or slit 141 of high pressure valve 142. The valve 142 is acted upon by a spring 143, which is normally under no tension when the valve 142 is closed, but which tends to resist the flow of liquid from the compression chamber 127 as a function of the pressure is the chamber. Disposed in series relation with the valve 142 is a nut 144 having an aperture 145. By a suitable selection of the size of the aperture 145, the resistance to flow of liquid from the compression chamber 127 is made proportional to the velocity of movement of the piston 104.

It should be noted that the springs 137 and 143 are comparatively heavy springs, with the result that the resisting force to flow of liquid from the respective compression chambers, although proportional to the velocity of movements of the pistons, is nevertheless rather high.

The operation of the shock absorber disclosed in Fig. 5 is as follows: When the vehicle moves along the road bed and a raised portion is encountered, the arm 105 will be moved in a counterclockwise direction and the piston 104 will subject the liquid in the compression chamber 127 to compression, but since the body or sprung mass of the vehicle to which the casing 101 is considered to be connected has not yet accelerated, the apertures 123 will be open and, in consequence, the movement of the unsprung mass will be resisted by a comparatively small force exerted by the spring 129 and the aperture 131, which force will be proportional to the velocity of movement of the piston 104.

After the springs have been fully compressed and the sprung mass begins to accelerate vertically upwardly, the arm 105 will be moved in a clockwise direction and, in consequence, the piston 106 will subject the liquid in the compression chamber 115 to compression and the liquid will be forced through the conduit 154 and conduit 132, through the slit 134 of the high pressure valve 133 and apertures 136 to the low pressure compression chamber 127. Since the spring 137 is rather heavy, the force resisting the movement of the liquid will be comparatively high but, nevertheless, proportional to the velocity of movement of the sprung mass. Since the velocity which occurs at the initial stages is zero, the force will be very small and will rapidly rise until the force resisting the movement of the piston 106 becomes equal to the force of the spring tending to accelerate the sprung mass vertically upwardly.

There will be no free flow condition during the vertically upward acceleration because the weighted valve 110' will lag behind the body movement and close the apertures 152. However, as soon as the force tending to accelerate the sprung mass vertically upwardly equals the force of the springs, the apertures 152 will be gradually opened so that the flow of liquid from the compression chamber 115 will now not only pass through the conduit 132 and the valve 133, but will also pass through the conduit 113, aperture 152 and valve 121 to the low pressure compression chamber. The proportion to which the valve 110' will open the aperture 152 will depend upon the force of the spring and, as the force of the spring decreases, the opening at the aperture 152 will increase more and more until the sprung mass will have taken its normal position with reference to the unsprung mass, at which time the aperture 152 will be completely open.

When a depressed portion is encountered in the road bed, the arm 105 will first move in a clockwise direction and the liquid in the compression chamber 115 will be forced through conduits 154 and 113, apertures 152, the slit 129 of valve 121 and aperture 118 to the low compression chamber 127. After the springs have been fully expanded and the sprung mass begins to accelerate downwardly, the arm 105 will be moved in a counter-clockwise direction and liquid from the compression chamber 127 will be forced into the conduit 126.

For a vertically downward acceleration of the sprung mass, the valve 122' will lag behind the movement of the sprung mass and in consequence, apertures 123 will be closed. The result will be that the liquid from the compression chamber 127 will be forced into the conduits 126 and 140 through the slit 141 of the high pressure valve 142, and through aperture 145 into the conduit 154 and thence into the low-pressure compression chamber 115. The resistance to movement of the arm 105 in a counter-clockwise direction, by reason of the coaction of the valve 142, the spring 143 and the aperture 145, will be proportional to the velocity of the sprung mass in a downward direction. Since the velocity is of varying value, namely from zero to somewhat higher values, the resisting force also varies from zero to some high value and is thus no abrupt restraining force to the vertical movement of the body or sprung mass.

As the resisting force builds up, it will soon be equal to the force of the springs tending to accelerate the sprung mass in a downward direction and when the force is of such value, the apertures 123 will gradually open, thereby permitting liquid from the compression chamber 127 also to flow through the valve 125. As the apertures 123 are opened more and more, the resisting force is decreased more and more and follows in value the force of the springs tending to accelerate the sprung mass in a downward direction. The sprung mass, therefore, gradually takes a normal position with reference to the unsprung mass without any oscillations back and forth with reference to such normal position.

In both of the modifications shown in Figs. 1 and 4, as well as the modification shown in Fig. 5, the apertures, such as 22, 31, 118, 145, etc. are thin walled apertures so that the viscosity of the liquid and in consequence the temperature of the liquid will not change the operating characteristics of the shock absorber.

In the foregoing description, in conjunction with a reference to the drawings, I have disclosed a shock absorber which provides a force for resisting relative movements of the sprung and unsprung masses of a vehicle, when the vertical velocity of the sprung mass is increasing, as a function of the velocity of the sprung mass and thereafter preventing an increase in vertical velocity of the sprung mass by a force proportional to the force exerted by the springs.

While the illustrated examples constitute practical embodiments of my invention, I do not limit myself strictly to the exact details herein illustrated, since various further modifications thereof may be made without departing from the spirit of the invention as defined in the appended claims.

I claim as my invention:

1. In a shock absorber for vehicles having a sprung mass and an unsprung mass, in combination, a casing, a compression chamber in the casing, said compression chamber containing liquid, means for subjecting the liquid in the compression chamber to a compressive action when the sprung mass is accelerated vertically, conduit means through which liquid moves when being expelled from said compression chamber, and control means, disposed in various parts of said conduit means and having two operating conditions, adapted, for one operating condition, to resist the expulsion of the liquid from the compression chamber by a force substantially directly proportional to the vertical velocity of the sprung mass and, for the other operating condition, adapted to resist the expulsion of the liquid from the compression chamber by a force substantially equal to the force tending to accelerate the sprung mass.

2. A shock absorber comprising, in combination, a casing providing a cylinder; a piston in said cylinder forming a compression chamber at each end thereof; valve chambers; a duct leading from each compression chamber respectively, each duct having branch portions communicating with the respective valve chambers; pressure release valves in two of the valve chambers, each valve normally cutting off communication between the branches of the two ducts leading thereinto; an orifice in series with each release valve whereby the resistance to flow of liquid through the release valve and orifice is made proportional to velocity of liquid flow; and a control valve in each of the remaining valve chambers, normally resisting the flow of liquid therethrough by a relatively small force, which force is, however, proportional to the velocity of the liquid flow, but adapted to restrict said flow in response to predetermined oscillations of the shock absorber casing.

3. A hydraulic shock absorber having two fluid displacement chambers each provided with an outlet; inertia means adapted to be actuated to restrict the flow of fluid from either outlet; and a plurality of apertures and a plurality of spring loaded valves adapted to regulate fluid flow through said outlets proportional to the velocity of the change in volume of the respective displacement chambers, certain of said valves being movable by the fluid pressure only when the inertia means is in fluid-flow-restricting position.

4. A shock absorber comprising, in combination, a casing providing a cylinder; a piston in said cylinder forming two compression chambers therein; ducts provided with valves and apertures in series therewith adapted, in response to pressure, to establish pressure-relieving flows of fluid through said ducts, said relieving force being proportional to the velocity of movement of the piston; passages connecting the ducts with valve chambers and adapted to shunt the fluid flow past the valves and through the valve chambers; and valves in said respective valve chambers for controlling the flow of fluid through said passages and valve chambers in response to accelerations of the casing only.

5. A shock absorber for absorbing energy comprising, in combination, a low-pressure and a high-pressure fluid chamber, a conduit leading from the high-pressure chamber to the low-pressure chamber, an inertia controlled hydrostatically balanced valve and a selectable fluid flow restricting member in series therewith disposed in the conduit, and other conduit means for also transferring a fluid from the high-pressure chamber to the low-pressure chamber.

6. A shock absorber for vehicles, of the type having a sprung and an unsprung mass comprising, in combination, means adapted to resist the relative movements of the masses by a force that is determined by the vertical velocity of the sprung mass during the period when the vertical velocity of the sprung mass is increasing, said force being large when the velocity is large and small when the velocity is small, and means associated with the resisting means to resist the relative movements of the masses by a force proportional to the velocity of the sprung mass with reference to the unsprung mass.

7. A shock absorber for vehicles of the type having a sprung and an unsprung mass, comprising, in combination, two relatively-movable elements actuated by the relative movements of the masses for subjecting a fluid to pressure, means, influenced by the rate of movement of the sprung mass in a vertical direction, for resisting the relative movement of the sprung and unsprung mass by one force substantially directly proportional to the velocity of movement of the sprung mass, and means, not influenced by the rate of movement of the sprung mass, adapted to resist the relative movement of the sprung mass and unsprung mass by another force substantially directly proportional to the vertical velocity of the sprung mass.

8. A shock absorber for vehicles of the type having a sprung and an unsprung mass, comprising, in combination, a chamber for containing a supply of fluid, a cylinder, and a piston, shorter than the cylinder, in the cylinder to form fluid compression chambers at the cylinder ends, valves through which fluid passes freely from the supply chamber into said compression chambers, means adapted to actuate the piston by the relative movements of the masses for subjecting the fluid in the compression chambers to pressure, a conduit through which fluid flows to the supply chamber from the compression chamber subject to volume decrease when the piston is moved, valve means, responsive to fluid velocity in the conduit adapted to resist the flow of fluid to the supply chamber by a force that is a direct function of the velocity of movement of the sprung mass, and an inertia-controlled hydrostatically balanced valve adapted to control said valve means and through which fluid may also flow to the supply chamber.

9. A shock absorber for vehicles of the type having a sprung and an unsprung mass, comprising, in combination, a cylinder, a fluid supply reservoir, means for admitting fluid to the cylinder from the said reservoir, a piston actuated by the relative movements of the said masses for subjecting the fluid at one end of the cylinder to pressure, means including a hydrostatically balanced control valve, a high pressure responsive valve and an adjustable restricting orifice controlled by the control valve for controlling the expulsion of said fluid from the high-pressure end of the cylinder, and a control mass for actuating said control valve.

10. A shock absorber for vehicles of the type having a sprung mass and an unsprung mass, comprising, in combination, a cylinder closed at both ends and containing a fluid, a two-way piston actuated by the relative movement of said masses, in the cylinder and thus forming compression chambers in the cylinder at both ends of the piston, a fluid supply chamber, means for admitting fluid to the compression chambers from said supply chamber, fluid-flow control means for permitting movement of fluid from one compression chamber to the other upon movement of the piston, said fluid flow control means including a hydrostatically balanced control valve, a high-pressure responsive valve and a flow resisting orifice controlled by said control valve, and a control mass adapted to actuate said control valve.

11. Liquid pressure control means for a hydraulic shock absorber, comprising, in combination, a hydrostatically balanced valve, a high-pressure multiplying valve controlled by the balanced valve, conduit means in shunt relation to said hydrostatically balanced valve, said conduit means having a restricted fluid passage, and exchangeable means for adjustably varying the opening of the restricted fluid passage.

12. Liquid pressure control means for a hydraulic shock absorber comprising, in combination, a hydrostatically balanced valve, a high-pressure multiplying valve controlled by the balanced valve, conduit means having a restricted fluid passage for also controlling the multiplying valve, exchangeable means for adjustably varying the opening of the restricted fluid passage, and inertia means responsive to acceleration adapted to control the balanced valve.

13. In a system of valves used in a hydraulic shock absorber, in combination, a hydrostatically balanced valve, a high-pressure valve controlled by the balanced valve, and conduit means having a restricted fluid passage for providing intercommunication between the high pressure sides of said valves.

14. In a system of valves for a hydraulic shock absorber, in combination, a hydrostatically balanced valve, a high-pressure valve controlled by the balanced valve, conduit means having a restricted fluid passage for providing intercommunication between the high pressure sides of said valves, and inertia means adapted to actuate said balanced valve as a function of change of velocity of said inertia means.

15. In a system of valves for a hydraulic shock absorber, in combination, a hydrostatically balanced valve, a high-pressure valve controlled by the balanced valve, conduit means having a restricted fluid passage for providing interconnection between the high pressure sides of said valves, and a pressure relief valve communicating with the high-pressure valve.

16. In a system of valves for a hydraulic shock absorber, in combination, a hydrostatically balanced valve, a high-pressure valve controlled by the balanced valve, conduit means having a restricted fluid passage for providing interconnection between the high pressure sides of said valves, a pressure relief valve communicating with the high-pressure valve, and inertia means adapted to control the balanced valve.

17. In a valve system for a hydraulic shock absorber, in combination, multiplying valve means including a high pressure valve, a hydrostatically balanced valve controlling said high pressure valve and conduit means having a restricted fluid passage between said high pressure valve and the balanced valve, a piston, a cylinder for the piston to form a high compression chamber, and means for actuating the piston to subject the liquid therein to compression.

18. A hydraulic shock absorber having a fluid displacement chamber provided with an outlet; inertia means adapted to be actuated to restrict the flow of fluid through said outlet; a plurality of apertures also adapted to restrict the flow of fluid through said outlet; and a plurality of spring loaded valves adapted to regulate fluid flow through said outlet substantially proportional to the velocity of the change in volume of the displacement chamber, one only of said plurality of valves being movable by the fluid pressure in the displacement chamber when the inertia means is in fluid-flow-restricting position.

19. A hydraulic shock absorber having two fluid displacement chambers each provided with an outlet; inertia means adapted to be actuated to restrict the flow of fluid from either outlet; a plurality of apertures for also controlling the flow of fluid through said outlets, and a plurality of spring loaded valves adapted to regulate fluid flow through said outlets substantially proportional to the velocity of the change in volume of the respective displacement chambers.

20. A hydraulic shock absorber comprising, in combination, a casing providing a cylinder; a piston in said cylinder forming a compression chamber at each end thereof; valve chambers; a duct leading from each compression chamber respectively, each duct having branch portions communicating with the respective valve chambers; pressure release means in certain of said chambers, each means normally cutting off communication between the branches of the two ducts leading thereinto; a fluid flow restricting orifice in series with each pressure release means and designed so that, in coaction with the pressure release means, the flow of liquid through the respective branch portions is made substantially proportional to the velocity of liquid flow; and control means disposed to control the flow of fluid through said outlets proportional to the predetermined oscillations of the shock absorber.

21. A hydraulic shock absorber for vehicles of the type having a sprung mass and an unsprung mass, comprising, in combination, two relatively-movable elements actuated by the relative movements of the masses for subjecting a fluid to pressure, a means adapted to resist the relative movement of the sprung mass and unsprung mass as a function of the velocity of movement of one of the masses with reference to the other, another means adapted to also resist the relative movement of the sprung mass and unsprung mass as a function of the velocity of movement of one of the masses with reference to the other, and inertia means adapted to control the operation of at least one of said mentioned means.

CLINTON R. HANNA.